United States Patent
Kellner

(10) Patent No.: US 11,038,219 B2
(45) Date of Patent: Jun. 15, 2021

(54) BATTERY ARRANGEMENT AND METHOD FOR PRODUCING IT

(71) Applicant: Dr. Ing. h.c. F. Porsche Aktiengesellschaft, Stuttgart (DE)

(72) Inventor: Philipp Kellner, Renningen (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 190 days.

(21) Appl. No.: 15/726,400

(22) Filed: Oct. 6, 2017

(65) Prior Publication Data

US 2018/0102574 A1   Apr. 12, 2018

(30) Foreign Application Priority Data

Oct. 10, 2016 (DE) .................. 10 2016 119 222.8

(51) Int. Cl.
| | |
|---|---|
| *B60L 58/26* | (2019.01) |
| *H01M 10/613* | (2014.01) |
| *H01M 10/6556* | (2014.01) |
| *H01M 50/20* | (2021.01) |
| *H01M 10/625* | (2014.01) |
| *H01M 10/6557* | (2014.01) |

(52) U.S. Cl.
CPC .......... *H01M 10/613* (2015.04); *B60L 58/26* (2019.02); *H01M 10/625* (2015.04); *H01M 10/6556* (2015.04); *H01M 10/6557* (2015.04); *H01M 50/20* (2021.01); *Y02T 10/70* (2013.01)

(58) Field of Classification Search
CPC ............. H01M 2/1077; H01M 10/613; H01M 10/625; H01M 10/6556; H01M 10/6557; H01M 2220/20; H01M 10/6552; B60L 58/26; Y02T 10/7005; Y02T 10/705
See application file for complete search history.

(56) References Cited

U.S. PATENT DOCUMENTS

| | | | |
|---|---|---|---|
| 9,196,935 B2 | 11/2015 | Han et al. | |
| 9,647,249 B2 | 5/2017 | Boddakayala | |
| 2006/0042782 A1* | 3/2006 | Chen | H01L 23/467 165/80.3 |
| 2011/0117410 A1* | 5/2011 | Yoon | H01M 2/1077 429/120 |
| 2012/0009455 A1* | 1/2012 | Yoon | H01M 10/653 429/120 |
| 2013/0273829 A1* | 10/2013 | Obasih | H01M 10/625 454/284 |
| 2014/0113172 A1* | 4/2014 | Enghardt | H01M 2/206 429/120 |
| 2016/0069622 A1* | 3/2016 | Alexiou | G06F 1/1656 165/146 |
| 2016/0093931 A1 | 3/2016 | Rawlinson et al. | |
| 2016/0222631 A1* | 8/2016 | Kohno | B60K 6/28 |

FOREIGN PATENT DOCUMENTS

| | | |
|---|---|---|
| CN | 103219559 A | 7/2013 |
| CN | 104051818 A | 9/2014 |
| DE | 202004021233 U1 | 4/2007 |
| EP | 3070780 A1 | 9/2016 |
| WO | WO-2014173419 A1 * 10/2014 | ........... G06F 1/1656 |

OTHER PUBLICATIONS

Reshift Media. "Which Metals Conduct Heat Best?" Metal Supermarkets—Steel, Aluminum, Stainless, Hot-Rolled, Cold-Rolled, Alloy, Carbon, Galvanized, Brass, Bronze, Copper, Feb. 17, 2016, www.metalsupermarkets.com/which-metals-conduct-heat-best/. (Year: 2016).*

* cited by examiner

*Primary Examiner* — Anca Eoff

(74) *Attorney, Agent, or Firm* — Leydig, Voit & Mayer, Ltd.

(57) ABSTRACT

A battery arrangement, such as for a motor vehicle, includes a plurality of cells for storing electric energy, the cells being arranged on a carrier component, and a cooling arrangement, the cooling arrangement having cooling ducts which are configured to allow a cooling medium to flow therethrough, The cooling ducts are produced at least in sections by way of an additive application process involving layer by layer material application on the carrier component.

6 Claims, 1 Drawing Sheet

BATTERY ARRANGEMENT AND METHOD FOR PRODUCING IT

CROSS REFERENCE TO RELATED APPLICATIONS

This application claims benefit to German Patent Application No. DE 10 2016 119 222.8, filed Oct. 10, 2016, which is hereby incorporated by reference herein.

FIELD

The present invention relates to a battery arrangement, in particular for a motor vehicle, having a plurality of battery cells for storing electric energy, and having a cooling arrangement in order to cool the battery cells. Furthermore, the invention relates to a method for producing a battery arrangement of this type. Battery arrangements of this type usually serve to store electric energy in a motor vehicle and to provide it to an electric drive machine for driving the motor vehicle.

BACKGROUND

It is generally known in the field of battery technology for motor vehicles to cool battery cells in the traction battery, in order to dissipate great heat quantities which occur as a result of high currents and great electric power outputs during the traction of the motor vehicle.

In a traction battery, cooling medium lines, in which a coolant is conducted, or cooling plates are usually arranged between the individual battery cells for cooling purposes, in order to also dissipate the heat quantity which occurs from the interior of the traction battery.

US 2016/0093931 discloses a battery apparatus which has electrically insulated heat sinks in order to improve the thermal loading of the battery pack and the safety. The battery apparatus is divided into groups of individual batteries, the batteries within each group having the same voltage, and each battery group being coupled in series to the other battery groups. The heat sink is segmented, each heat sink segment being coupled thermally to the batteries of a single battery group, and each heat sink segment being insulated electrically from adjacent heat sink segments. The heat sink segments are coupled thermally and insulated electrically with respect to at least one cooling duct which in turn is coupled to a heat management system.

According to the prior art, furthermore, cooling ducts in the form of thin-walled extruded profiles are frequently used for cooling large underfloor batteries. Said cooling ducts have to be pressed and/or adhesively bonded onto the bulkhead plate or the battery modules in a complicated and expensive manner, however. In addition, the cooling action is not optimum, since the cooling medium reaches the bulkhead plate or the battery modules only via the walls of the cooling ducts and an adhesive film.

SUMMARY

In an embodiment, the present invention provides a battery arrangement including a plurality of cells for storing electric energy, the cells being arranged on a carrier component, and a cooling arrangement, the cooling arrangement having cooling ducts which are configured to allow a cooling medium to flow therethrough, The cooling ducts are produced at least in sections by way of an additive application process using layer by layer material application on the carrier component.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
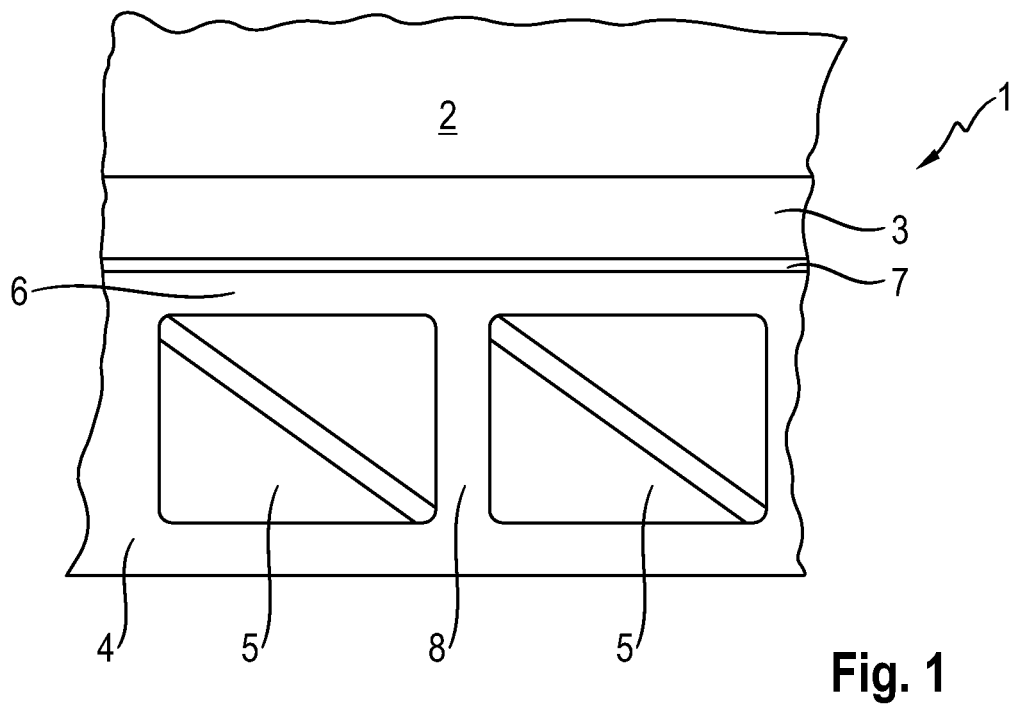
FIG. 1 shows a diagrammatic perspective detail of a battery arrangement having a cooling arrangement in accordance with the prior art.

Embodiments of the present invention provide battery arrangements in which disadvantages of the prior art can be avoided and in which more direct and therefore more effective cooling can be achieved.

Embodiments of the present invention provide battery arrangements having a plurality of battery cells arranged on a carrier component and a cooling arrangement for cooling the battery cells. The cooling arrangement includes cooling ducts that can be, e.g., produced at least in sections by an additive application process involving layer by layer material application on the carrier component. Since additive manufacturing processes are still very expensive, only the thin-walled cooling ducts are printed onto a module housing part or a bulkhead plate which is produced, for example, by means of rolling, shaping or extrusion. As a result, a cooling medium can flow directly on the bulkhead plate. on a module wall, or on a module bottom, with the result that cooling becomes considerably more efficient. At the same time, expensive adhesives and springs and tolerance problems can be avoided.

According to one preferred exemplary embodiment, the cooling ducts can have a rectangular or square cross section, in particular with rounded contours, or a semicircular cross section. Cross-sectional shapes of this type can be produced simply.

Furthermore, it is advantageous that the cooling ducts are open on at least one side. This makes a material-saving application by way of the additive production process possible, with the result that rapid and inexpensive production is possible.

The cooling ducts can particularly preferably be open on the side which faces the carrier component. As a result, direct contact of the cooling medium with the carrier component is possible, as a result of which the heat dissipation can be improved considerably.

According to a further advantageous design variant, the cooling ducts can also be open on a side which faces away from the carrier component. Merely separating ribs then have to be applied by way of the additive application process.

The side which faces away from the carrier component can advantageously be closed by way of a plate. This imparts additional stability to the cooling arrangement.

The additive application process can preferably comprise one or more of the methods of selective laser melting or laser sintering, laser deposit welding, electron beam melting or stereolithography. The stated methods are highly versatile and are distinguished by high efficiency and material quality.

Furthermore, it is advantageous that the carrier component and the cooling arrangement consist at least partially of steel, copper, aluminum, magnesium or alloys thereof and/or of plastic. The stated materials are inexpensive and can be processed satisfactorily.

The carrier component and the cooling arrangement can particularly preferably both consist of aluminum. As a result, a particularly satisfactory connection and, in addition, a weight saving can be achieved.

In order to clarify the invention, FIG. 1 first of all shows a greatly diagrammatic perspective view of a high voltage battery 1 in accordance with the prior art. The high voltage battery 1 can be used in electric or hybrid vehicles. Said battery which is called an HV battery 1 in the following text is constructed from a plurality of cells 2 (not shown in greater detail in the figures) which can also be combined to form modules and can be arranged in module housings. The cells 2 are mounted on a substantially plate-shaped carrier component 3. The carrier component 3 can be, for example, a separate bulkhead plate or the abovementioned module housing, and is designed for absorbing mechanical forces.

Efficient cooling of the cells 2 is necessary during operation of the electric or hybrid vehicle, which cooling takes place by means of a cooling arrangement 4. Here, the cooling arrangement 4 has cooling ducts 5 which can be connected to a coolant supply which is not shown in further detail and is known per se.

The cooling ducts 5 are usually formed by extruded profiles which are connected to the bulkhead plate 3 or the cells 2 which are combined in the battery modules, for example by way of adhesive bonding. The cooling ducts 5 can also be attached directly on the cells 2, however.

A construction of this type has the abovementioned disadvantage of the loss of cooling performance as a result of a wall 6 of the cooling ducts 5 which bears against the carrier component 3 and as a result of an adhesive film 7 which is additionally present between the cooling ducts 5 and the carrier component 3 for fixing the cooling ducts 5 on the carrier component 3 and for bridging tolerances.

Figure 2:
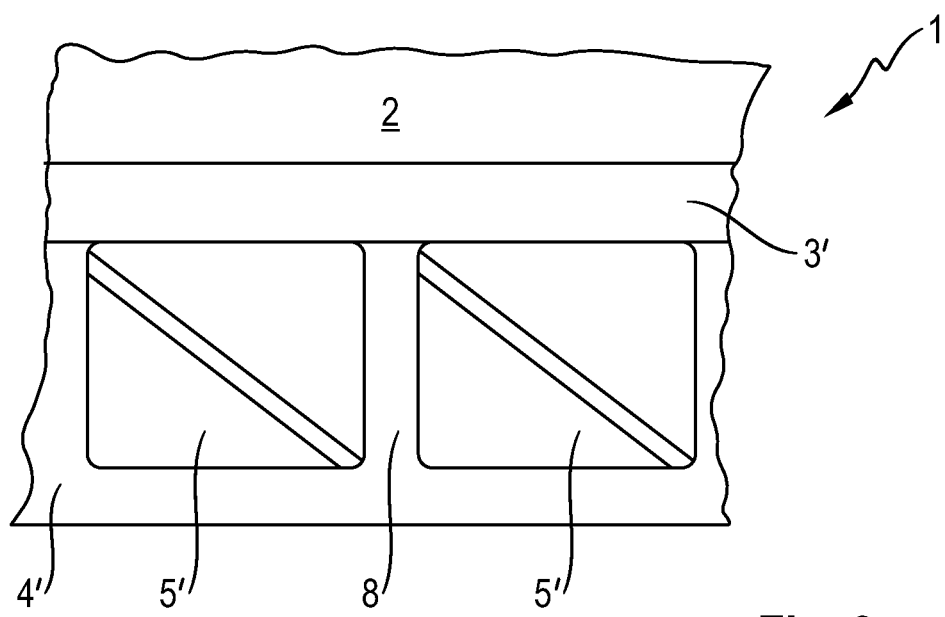
FIG. 2 shows a diagrammatic perspective detail of a battery arrangement having a cooling arrangement according to an embodiment of the invention.

In order to remedy the loss of cooling performance, it is proposed according to an embodiment of the invention to provide a single-piece cooling apparatus for the HV battery 1, which cooling apparatus likewise has a plate-shaped carrier component 3 and a cooling arrangement 4 which is constructed integrally thereon. One exemplary embodiment of the invention is shown in FIG. 2 in an identical view to that of FIG. 1. Here, identical components are provided with identical designations.

In an analogous manner to the carrier component 3 which is shown in FIG. 1, the carrier component 3 can be produced by means of conventional primary forming or reshaping production processes. The cooling arrangement 4 is attached at least in sections to the carrier component 3 by means of additive production processes.

Here, the carrier component 3 and the cooling arrangement 4 are preferably not produced separately and subsequently connected, but rather the carrier component 3 forms the base for the additive production of the cooling arrangement 4. This can preferably take place by way of a layer by layer material application to the carrier component 3. Corresponding processes are known under the designation 3D printing, rapid prototyping or rapid manufacturing, and, depending on the material, can comprise methods such as selective laser melting or laser sintering, laser deposit welding, electron beam melting, stereolithography, etc.

Copper, aluminum or magnesium may be suitable as materials for the combined component comprising the carrier component 3 and the cooling arrangement 4; here, aluminum is preferred for both components.

Further material alternatives are, for example, steel, copper, aluminum or magnesium for the carrier component 3, and aluminum, magnesium or plastic for the cooling arrangement 4. Various plastics can be processed satisfactorily by way of the stated application processes, and can contribute to the weight saving of the component.

The possible cross-sectional shapes for the cooling ducts 5 are in principle virtually unlimited. In particular, shapes may be suitable, however, which are square or rectangular. Here, rounded corners of the polygonal cross sections are to be preferred, since they aid the flow behavior of the cooling medium. Semicircular cross-sectional shapes are also possible, the truncated side of the semicircular shape facing the carrier component 3.

In FIG. 2, the carrier component 3' is configured by way of example as a bulkhead plate, onto which the cooling arrangement 4' is printed with the formation of cooling ducts 5'. The cells 2 are arranged on that side of the bulkhead plate which lies opposite the cooling arrangement 4', with the result that the bulkhead plate shields the electric components from the cooling medium.

The carrier component 3' can also be a wall of a battery module housing, however, on the outer side of which the cooling arrangement 4 with the cooling ducts 5' is printed, the cells 2 then being arranged within the battery module housing, with the result that the wall of said battery module housing shields the electric components from the cooling medium.

In every case, the carrier component 3' should be of planar configuration at least on the side or in the section, on which the cooling arrangement 4' is applied by means of additive production, in order to assist a satisfactory adhesion and a homogeneous material application.

Cooling medium then flows through cooling ducts 5' which, in the exemplary embodiment which is shown in FIG. 2, are delimited on three sides by the additively applied material and on one side by the carrier component 3'. As a result, there is a direct contact of the cooling medium with the carrier component 3', with the result that very effective heat dissipation from the cells 2 is made possible.

As an alternative to this and not shown in further detail, the cooling medium can also flow in cooling ducts which are delimited on all four sides by the additively applied material, in order that first of all a full surface area layer of the material which is to be applied additively is therefore applied. As a result, at least the adhesive film for connecting the cooling arrangement 4' to the carrier component 3' can be dispensed with, and a very satisfactory heat transfer with increased stability of the cooling arrangement 4 can therefore still be achieved. The adhesive bond can be dispensed with as a result.

An embodiment is also conceivable, in which merely ribs 8 which separate the cooling ducts 5' from one another are applied by way of the additive production process, and, on the side which faces away from the carrier component 3', the cooling ducts 5' are closed, for example, by way of a plate made from any desired suitable material. Said embodiment can be manufactured particularly simply, and can therefore be produced both inexpensively and rapidly.

Overall, the advantages of embodiments of the invention are to be seen in the fact that the cooling efficiency is improved, a functional integration, a weight reduction and cost reduction can be achieved by way of the omission of adhesive and possibly further coupling components, and a lower installation space requirement results.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A battery arrangement comprising:
    a plurality of cells for storing electric energy, the cells being arranged on a carrier component, and
    a cooling arrangement, the cooling arrangement having cooling ducts which are configured to allow a cooling medium to flow therethrough,
    wherein the cooling ducts are produced at least in sections by an additive application process using layer by layer material application on the carrier component,
    wherein a physical structure of the cooling ducts has a functional material integration of the material applied by the layer by layer material application on the carrier component with the material of the carrier component,
    wherein the carrier component comprises a plate with a top surface and a bottom surface,
    wherein the cells are arranged on the top surface of the plate,
    wherein the cooling ducts are on the bottom surface of the plate,
    wherein the cooling ducts comprise at least a first wall and a second wall extending away from the bottom surface of the plate,
    wherein the first wall and the second wall are spaced apart from each other in a lateral direction,
    wherein the cooling ducts comprise a bottom wall, arranged opposite the bottom surface of the plate, and functionally integrated with the first wall and the second wall,
    wherein at least one of the cooling ducts is delimited on four sides by the first wall, the second wall, the bottom wall, and a portion of the bottom surface of the plate such that the cooling duct is configured to provide direct contact between a cooling medium and the bottom surface of the plate.

2. The battery arrangement as claimed in claim 1, wherein the cooling ducts have a rectangular or square cross section with rounded contours or a semicircular cross section.

3. The battery arrangement as claimed in claim 1, wherein the additive application process comprises one or more of selective laser melting or laser sintering, laser deposit welding, electron beam melting, or stereolithography.

4. The battery arrangement as claimed in claim 1, wherein the carrier component and the cooling arrangement comprise steel, copper, aluminum, magnesium, or alloys thereof and/or plastic.

5. The battery arrangement as claimed in claim 4, wherein the carrier component and the cooling arrangement comprise aluminum.

6. A method for producing a battery arrangement for a motor vehicle, in the method comprising:
    producing a carrier component by primary forming or reshaping; and
    applying, via a layer by layer application process, material to the carrier component in order to form a cooling arrangement having cooling ducts by an additive application process,
    wherein a physical structure of the cooling ducts has a functional material integration of the material applied by the layer by layer material application on the carrier component with the material of the carrier component,
    wherein the carrier component comprises a plate with a top surface and a bottom surface,
    wherein the cells are arranged on the top surface of the plate,
    wherein the cooling ducts are on the bottom surface of the plate,
    wherein the cooling ducts comprise at least a first wall and a second wall extending away from the bottom surface of the plate,
    wherein the first wall and the second wall are spaced apart from each other in a lateral direction,
    wherein the cooling ducts comprise a bottom wall, arranged opposite the bottom surface of the plate, and functionally integrated with the first wall and the second wall,
    wherein at least one of the cooling ducts is delimited on four sides by the first wall, the second wall, the bottom wall, and a portion of the bottom surface of the plate such that the cooling duct is configured to provide direct contact between a cooling medium and the bottom surface of the plate.

* * * * *